United States Patent
Steves et al.

(10) Patent No.: US 8,958,652 B1
(45) Date of Patent: Feb. 17, 2015

(54) IDENTIFICATION OF PRODUCT ATTRIBUTES

(71) Applicant: Amazon Technologies, Inc., Reno, NV (US)

(72) Inventors: Andrea C. Steves, Seattle, WA (US); Sebastian Lehmann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/334,035

(22) Filed: Jul. 17, 2014

Related U.S. Application Data

(63) Continuation of application No. 13/171,647, filed on Jun. 29, 2011, now Pat. No. 8,787,707.

(51) Int. Cl.
*G06K 9/62* (2006.01)
*G06Q 30/02* (2012.01)

(52) U.S. Cl.
CPC ........ *G06Q 30/0204* (2013.01); *G06Q 30/0254* (2013.01)
USPC ............................ 382/225; 382/224; 382/181

(58) Field of Classification Search
USPC ......... 382/224, 225, 181, 312, 321, 107, 154; 702/186; 709/206, 224, 227; 705/26.62; 714/25, 47.2, E11.181; 715/224, 226
See application file for complete search history.

(56) References Cited

U.S. PATENT DOCUMENTS

| | | | |
|---|---|---|---|
| 6,072,598 A | 6/2000 | Tso | |
| 6,738,933 B2 * | 5/2004 | Fraenkel et al. | 714/47.2 |
| 7,197,559 B2 * | 3/2007 | Goldstein et al. | 709/224 |
| 7,382,903 B2 | 6/2008 | Ray | |
| 7,660,445 B2 | 2/2010 | Ray | |
| 7,692,845 B2 * | 4/2010 | Seo et al. | 359/296 |
| 7,725,547 B2 * | 5/2010 | Albertson et al. | 709/206 |

OTHER PUBLICATIONS

U.S. Appl. No. 12/712,998, filed Feb. 12, 2010 entitled "Image Acquisition System," inventor, Andrea Steves.

* cited by examiner

*Primary Examiner* — Anh Do
(74) *Attorney, Agent, or Firm* — Thomas | Horstemeyer, LLP

(57) ABSTRACT

Disclosed are various embodiments for performing an analysis on images of a product packaging. Capture of at least one image of at least one side of a packaging in initiated. An image analysis is performed on the at least one image. Product attributes are detected based at least upon the at least one image analysis and associated with the product in a data store.

20 Claims, 7 Drawing Sheets

IDENTIFICATION OF PRODUCT ATTRIBUTES

CROSS-REFERENCE TO RELATED APPLICATIONS

This application is a continuation of and claims the benefit of U.S. patent application Ser. No. 13/171,647, entitled "IDENTIFICATION OF PRODUCT ATTRIBUTES," and filed Jun. 29, 2011, which is hereby incorporated by reference in its entirety.

BACKGROUND

Products received in a fulfillment center are often associated with various product attributes. In the context of an electronic commerce system, certain product attributes may be desirable by customers but not marketed and/or categorized according to these attributes by electronic commerce systems. Attributes that may cause a product to be desired by consumers may come from various sources, such as, but not limited to, the product's exterior packaging, the manufacturer, and/or third party sources. Additionally, it may be difficult to determine what categories and/or attributes associated with a product that customers desire and generate subsequent product recommendations and targeting campaigns.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the disclosure can identify product attributes and other information that may appear on a product's packaging. Images of the various sides of a product packaging can be captured during the receiving process in a fulfillment center. Product attributes can be identified based on images analyses of the various sides of the product packaging. Additionally, products can be assigned to product categories to which they are not associated based on an analysis of imagery of the product's packaging, external data sources as well as purchasing trends and clusters that can be identified in an electronic commerce system.

Figure 1:
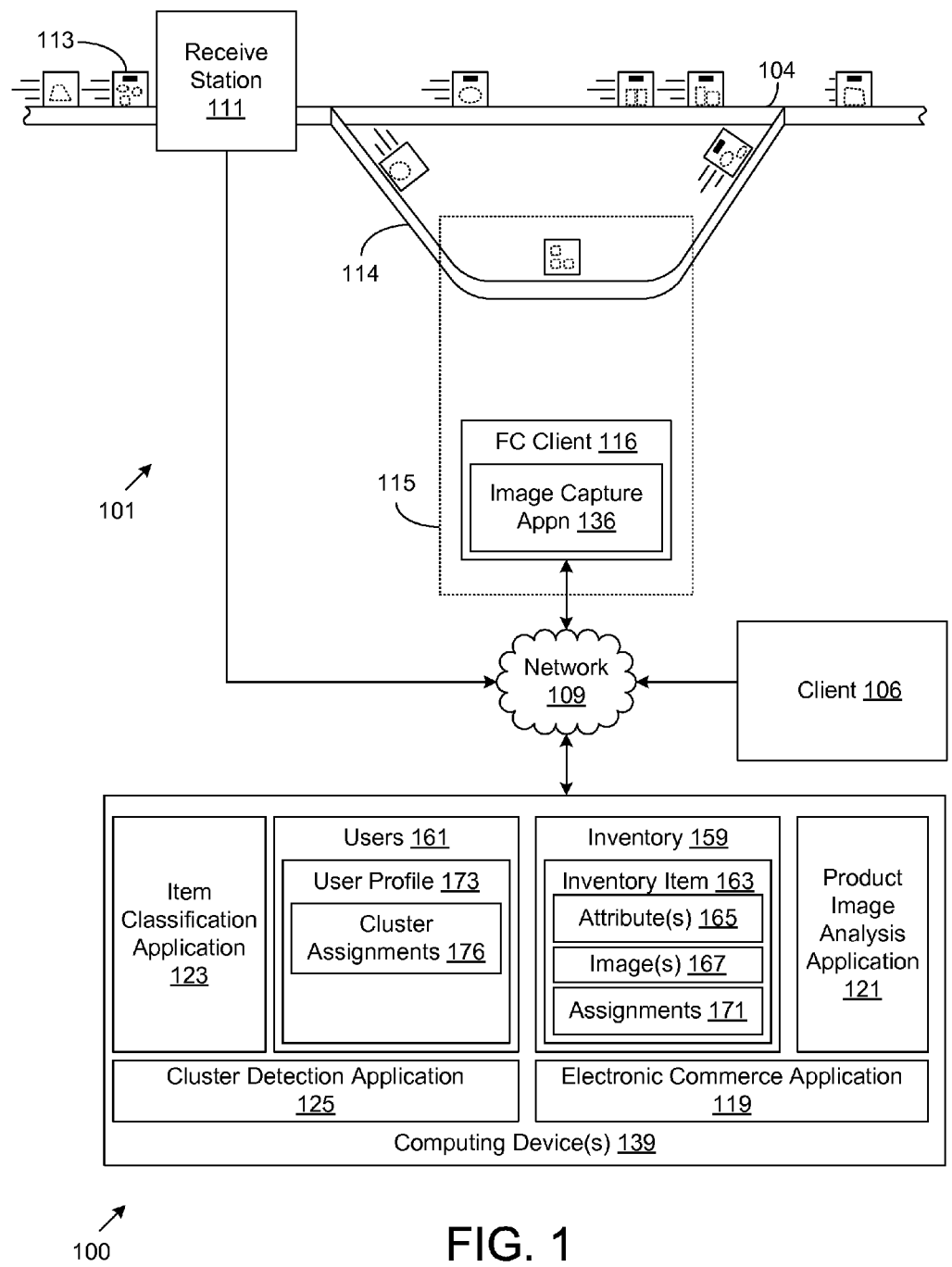
FIG. 1 is a drawing of a networked environment according to various embodiments of the present disclosure.

In the following discussion, a general description of the system and its components is provided, followed by a discussion of the operation of the same. With reference to FIG. 1, shown is a networked environment 100 according to various embodiments. The networked environment 100 also includes at least one fulfillment center 101, computing device 103 and/or client 106 in communication via one or more networks 109. The network 109 includes, for example, the Internet, intranets, extranets, wide area networks (WANs), local area networks (LANs), wired networks, wireless networks, or other suitable networks, etc., or any combination of two or more such networks.

Shown is a portion of a fulfillment center 101, which can include a warehouse, receiving facility, shipment facility, any logistics facility, or the like, in which items are received into an inventory. The fulfillment center 101 can include various conveyors, slides, chutes, or other materials handling structures that create one or more primary pathways 104 that guide the movement of shipments after being unloaded from trucks or other delivery vehicles destined for inventory locations within the fulfillment center 101. Although the primary pathway 104 may be described herein in the singular, it is understood that a fulfillment center 101 may have multiple parallel primary pathways 104 through which shipments of items may travel during the receive process. Also, various carts, totes, forklifts, and other materials handling equipment may be employed in the fulfillment center 101 to move shipments or items from place to place.

According to one embodiment, the fulfillment center 101 includes a receive station 111 that is used to perform an automated examination of items 113 and/or shipments that are to be received into inventory. Alternatively, such an examination of shipments may be performed manually. In some embodiments, the receive station 111 can identify shipments received in the fulfillment center 101 and scan shipment barcodes that identify a sender of the shipment via a shipment and/or vendor identifier. In other embodiments, the receive station 111 can capture imagery of a shipment and identify shipment identifiers and other information on the exterior of the shipment. The receive station 111 can also determine from a shipment identifier or other data captured from the exterior of the shipment packaging the contents of a particular shipment. Accordingly, the receive station 111 can also identify whether items contained within a shipment have already undergone a product imagery analysis as described herein. If an item has not undergone such an analysis, the receive station 111 can divert an item and/or shipment to an analysis pathway 114.

The analysis pathway 114 may comprise, for example, conveyor belts, slides, chutes, or other structures as can be appreciated. If the receive station 111 can determine that a product imagery analysis is unnecessary and/or has already been conducted for items contained within a shipment, the item and/or shipment can be diverted into analysis pathway 114, where the item can be analyzed by a product imagery capture station 115, which can capture various images of the item and/or its packaging as will be described herein.

The fulfillment center 101 can also include a fulfillment center client 116, which can be in communication with one or more image capture devices (e.g., cameras) in the product imagery capture station 115. The fulfillment center client 116 is representative of a plurality of types of computing devices or resources that may be employed for the purposes described herein. For example, the fulfillment center client 116 may comprise a processor-based system such as a computer system. Such a computer system may be embodied in the form of a desktop computer, a laptop computer, a personal digital assistant, a cellular telephone, web pads, tablet computer systems, or other devices with like capability.

The fulfillment center client 116 can execute an image capture application 136, which can facilitate capture of product imagery by the cameras associated with the product imagery capture station 115. In one embodiment, the product imagery capture station 115 can include one or more cameras positioned in each of an x-axis, y-axis, and z-axis relative to an item under analysis. In this way, the capture station 115 can capture imagery of at least one side of a product. In one example, the capture station 115 can facilitate capture of imagery from each of one camera positioned in each of the axes about a product and then facilitate rotation of the product about at least two of the axes, after which additional imagery of the item can be captured. In another embodiment, the capture station 115 can include six cameras where two cameras are each placed in opposing positions in each of the axes about the product under analysis and where an image of each side of the product can be captured.

In yet another embodiment, the capture station 115 can include a single camera where imagery of the product is captured and the product rotated and/or moved until imagery of at least one or all of the sides of the product packaging are captured by the camera. Other permutations and arrangements of one or more cameras in a capture station such that the imagery of the sides of the product's packaging are captured by the capture station 115 are also possible. Upon capture of imagery of the various sides of the product packaging, the captured imagery can be stored and/or transmitted to the computing device 103 by the image capture application 136.

In some embodiments, the image capture station 115 can include one or more cameras or image capture devices that rotate about the product. In other words, the product can be kept stationary while the camera is rotated about the product on a movable arm while various images of the various sides of the product's packaging are captured. In other embodiments, the product can be moved through an image capture station 115 (e.g., via a conveyor), where one or more image capture devices move about the product and capture images of its packaging. In some embodiments, a combination of movement and/or rotation of the product as well as movement and/or rotation of cameras about the product can be employed in order to capture images of the various sides of the product's packaging. Other systems and methods that can be employed for acquiring images of an object, such as a product's packaging, from multiple angles and/or directions, are described in U.S. application Ser. No. 12/712,998, filed Feb. 12, 2010, entitled "Image Acquisition System," which is hereby incorporated by referenced herein in its entirety.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store that is accessible to the computing device 103. The data store can be representative of a plurality of data stores as can be appreciated. A data store can also comprise a cloud computing data storage resource that is accessible to the computing device 103.

The components executed on the computing device 103 for example, include the electronic commerce application 119, product image analysis application 121, item classification application 123, cluster detection application 125 and other applications, services, processes, systems, engines, or functionality not discussed in detail herein. The electronic commerce application 119 can facilitate an electronic commerce site associated with one or more retailers through which customers can purchase, rent, and/or download products. To this end, the electronic commerce application 119 can process orders on behalf of customers and transmit network pages or other user interface elements that can be rendered on a client 106. Similarly, the electronic commerce application 119 can receive data from a client 106 pertaining to product selections, payment information, and other data necessary to effectuate an electronic commerce site. The specific functionality and various implementations of an electronic commerce site should be appreciated by a person of ordinary skill in the art, and is not discussed in detail herein.

The product image analysis application 121 is executed to analyze images of a product's packaging captured in a capture station 115 in the fulfillment center 101. In one embodiment, the image capture application 136 executed in a fulfillment center client 116 can transmit imagery of a product's packaging to the product image analysis application 121. Accordingly, the product image analysis application 121 can perform various image analysis techniques on the various images to extract product attributes, characteristics, ingredients, dimensions, and other data that is printed on the product's packaging. For example, the product image analysis application 121 can identify whether an "organic" or third party certification logo is imprinted on the product packaging by performing an image recognition algorithm that extracts logos imprinted on the packaging and comparing them to known logos. Other examples and variations of operation of the product image analysis application 121 are discussed below.

The item classification application 123 is executed to classify products available via the electronic commerce application 119 with attributes that can be provided by third party systems, identified in imagery of a product's packaging, specified by a user, detected in user purchasing trends, combinations of any of these factors as well as other inputs as described herein. The various inputs upon which the item classification application 123 can base decisions to classify products can be weighted in various ways according to the definitiveness or confidence of the inputs. In some embodiments, the item classification application 123 can provide recommendations regarding classification of products which can be acted upon by an administrative user.

The cluster detection application 125 can detect clusters of users of the electronic commerce application 119 that exhibit similar purchasing behavior. In one embodiment, the cluster detection application 125 can examine a population of users as well as a population of products available via the electronic commerce application 119 and employ one or more clustering algorithms to identify clusters of users that are associated with one or more products or classes of products available via the electronic commerce application 119.

In some embodiments, a cluster of users can describe a subset of users in the electronic commerce application 119 that have exhibited an affinity towards a product or category of products to the exclusion of another product or category of products. In other words, products or categories of products that have one or more opposing attributes or features relative to another product or categories of products can be considered when identifying clusters. For example, a cluster may identify a subset of users that purchase organic milk to the exclusion of non-organic milk. As another example, a cluster may also identify a subset of users that purchase gluten-free food items to the exclusion of food items that contain gluten.

Data that can be employed by the above-referenced applications can include inventory data 159, which contains information about inventory that is available via the electronic commerce application 119 and/or stocked in a fulfillment center 101. Inventory data 159 can include entries for each product or inventory item 163 available for purchase and/or rental via the electronic commerce application 119. Each inventory item can be associated with various attributes 165, which can include, for example, product categories, features, text attributes, search terms, keywords, product descriptions, or other data associated with a product by which it can be indexed. Images 167 captured by a capture station 115 in a fulfillment center 101 can also be stored with inventory data 159 associated with each inventory item 163. Each inventory item 163 is also associated with one or more assignments 171, which describe the product category assignments, browse node assignments, search terms, and other assignments by which a product is indexed and can be located by users of the electronic commerce application 119.

Data regarding users 161 of the electronic commerce application 119 can also be maintained and employed by the above-referenced applications. A user profile 173 can contain data about a user's purchasing history, preferences, interests, and other data. User data can also include cluster assignments 176 associated with the user. As described above, cluster assignments 176 can describe clusters of users that are associated with certain products and/or categories of products.

The client 106 is representative of a plurality of client devices that may be coupled to the network 109 The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may be configured to execute various applications such as a browser and/or other applications such as a special purpose application executed on a mobile device for the purposes of communicating with the computing device 103. Such an application may be executed in a client 106 for example, to access and render content pages, such as web pages, or other network content served up by the computing device 103 and/or other servers.

Next, a general description of the operation of the various components of the networked environment 100 is provided. To begin, as noted above, the fulfillment center 101 can receive shipments containing products to be stocked in an inventory in the fulfillment center. To this end, the fulfillment center 101 can include a receive station 111 at which shipments or products can be received and where a determination can be made whether to divert a shipment and/or product to the capture station 115, where imagery of a product's packaging can be captured for analysis. Accordingly, the capture station 115 can include one or more cameras that can be positioned in various axes relative to the product under analysis. In one embodiment, the capture station 115 can include six cameras, where two cameras are positioned in opposing positions in an x-axis, y-axis, and z-axis relative to the product under analysis. Accordingly, the image capture application 136 executed on the fulfillment center client 116 in communication with the capture station 115 can initiate capture imagery of the various sides of the product. In some embodiments, the product image analysis application 121 can initiate capture of imagery of the product's packaging by the capture station 115. In yet other embodiments, the capture of imagery of a product's packaging can be initiated by fulfillment center personnel. In any event, the captured imagery can be transmitted to the product image analysis application 121 for analysis as described herein.

Upon capture of imagery of the various sides of a product's packaging by the capture station 115, the product image analysis application 121 can analyze the imagery in order to extract product attributes that appear on the product's packaging by performing at least one image analysis technique on the captured imagery. The product image analysis application 121 can perform an optical character recognition algorithm on the captured imagery to attempt to identify product characteristics, ingredients, and other text that may appear on the product's packaging. For example, the product image analysis application 121 can identify whether a product's packaging identifies the product as "USDA certified organic" by determining whether this text appears on the product's packaging. As another example, the product image analysis application 121 can determine whether a product's packaging identifies the product as "gluten-free" by determining whether this or similar text appears on the product's packaging. As another example, the product image analysis application 121 can identify a nutritional information box associated with a food item, and the nutritional information can be extracted from the images of the product packaging and stored as attributes 165 associated with the inventory item 159 corresponding to the item. As another example, the product image analysis application 121 can also identify handling instructions regarding the product that are printed on the product's packaging and note any such handling instructions as a product attribute associated with the product.

The product image analysis application 121 can also perform one or more image recognition algorithms on the imagery and attempt to identify logos, pictures, or other imagery appearing on the product's packaging. In one embodiment, the product image analysis application 121 can compare imagery on the packaging to known images, such as, third party certification logos, trademarks, or other images that are associated with an attribute that might be associated with the product. For example, the product image analysis application 121 can determine whether a logo appearing on the packaging is the same or similar to a known logo associated with a third party certification, such as "USDA organic," "Fair Trade Certified," or other examples as can be appreciated.

The product image analysis application 121 can also determine whether a product for which product imagery is analyzed can be shipped to customers in the packaging in which it was received in the fulfillment center 101. In other words, the product image analysis application 121 can determine whether the product is "shipment safe" such that, if ordered by a user of the electronic commerce application 119 can fulfilled by the fulfillment center 101, it can be shipped in its own container or packaging, and/or without an overbox or other shipping materials. In this way, fulfillment of the product can be made more efficient by reducing or eliminating the need for addition.

Accordingly, the product image analysis application 121 can perform an image analysis to identify whether each side of the product's packaging is rectangular, which can weight the determination in favor of designating the product packaging as shipment safe. Additionally, it possesses certain features of the product's packaging which eliminates it from being considered shipment safe. For example, the product image analysis application 121 can determine whether the packaging is potentially non-rigid by analyzing the reflectiveness of the packaging as well as its shape. For example, non-rectangular packaging may be more likely to be non-rigid. Therefore, if an image analysis of images representing the various sides of the packaging reveals that one or more sides of the packaging are non-rectangular, the product image analysis application 121 can determine that the product under analysis is not shipment safe. As another example, the product image analysis application 121 can determine that product packaging that possesses a high reflectiveness is more likely to be non-rigid, such as in the case of product packaging having a transparent and/or translucent window that allows the product within to be visible. Therefore, the product image analysis application 121 can designate products associated with packaging that is highly reflective, or above a reflectiveness threshold, as non-shipment safe. As another example, the product image analysis application 121 can also determine, via an image recognition analysis, whether there exist perforations or other potential weaknesses in the product's packaging that can weigh against designating the product as shipment safe.

The product image analysis application 121 can also employ the optical character recognition techniques referenced above to determine whether text that may appear on the product packaging indicates that the product is fragile, breakable, or otherwise non shipment safe. The product image analysis application 121 can also identify text that references the contents, ingredients, or other aspects of a product to facilitate the determination of whether the product's packaging is shipment safe. As one example, the product image analysis application 121 can identify whether text appearing on the product packaging reveals that the product is made of glass or another breakable material may cause the product image analysis application 121 to designate the product as non-shipment safe. Additionally, the product image analysis application 121 can employ the image recognition techniques referenced above to determine whether any logos corresponds to known images that are associated with "fragile," "breakable," "hazardous" or any other known images or logos that may encourage care in the handling and/or shipment of the product.

The product image analysis application 121 can also identify whether text or imagery corresponding to a measure associated with an edge crush test rating appears on the product's packaging. If such a measure exists, which relates to the strength of a product's packaging, the product image analysis application 121 can determine whether the measure exceeds a predefined threshold, and designate the product as shipment safe of the edge crush test rating is greater than the threshold.

Accordingly, in order to make a determination regarding whether a product is shipment safe, the product image analysis application 121 can analyze one or more of the various factors noted above and, via a rules engine, generate a vote that corresponds to whether the product will be designated as shipment safe. Such a rules engine can designate the product in a product catalog as shipment safe, or it may also generate an alert associated with products that are potentially identified as shipment safe, after which an administrative user can approve or disapprove such a designation.

In some embodiments, the analysis performed by the product image analysis application 121 can act as one input associated with classification of an item within an inventory of products. Accordingly, the item classification application 123 is executed to receive various inputs associated with a product as well as users of the electronic commerce application 119 in order to categorize products according to the various data that can be obtained about the product. In this way, the item classification application 123 can allow a flexible product catalog structure that takes into account product information extracted from the packaging, provided by third party data feeds, customer trends, customer perceptions as well as purchasing history. To this end, the item classification application 123 can generate various assignments 171 associated with an inventory item 163 with which the product can be located by users of the electronic commerce application 119. In other words, these assignments 171 can include product categories, features, search terms, keywords, and other aspects around which products can be categorized.

In one embodiment, the item classification application 123 can include a rules engine that is configured with various rules regarding the decisions it can make about a product under analysis. The item classification application 123 can be configured with a rule that causes it to place a product in an "organic" product category, if the product image analysis application 121 identifies the word "organic" on the product packaging as well as whether a third party data feed from a certification board testing board and/or other third party entity also identifies the product as organic. As another example, it can be deemed with high confidence that if the above text appears on the product's packaging that it is in fact an organic product. As yet another example, if the product image analysis application 121 identifies a universal product code (UPC) barcode on the product packaging, the item classification application 123 can determine whether the UPC code appears in a third party certification board data feed. In such a scenario, the item classification application 123 can classify as described in the text of the product's packaging with a very high degree of confidence because it is able to obtain a third party confirmation that classification as described on the product packaging is accurate.

The item classification application 123 can also provide an administrative front end so that one or more administrative users can designate assignments 171 by which the product is indexed in the inventory data 159. In this way, administrative users can intervene and monitor the rules executed by the rules engine in the item classification application 123 that generates assignments 171 associated with inventory items 163.

The cluster detection application 125 can analyze purchase histories, purchasing trends, browsing history and other data to identify clusters of users associated with certain products or categories of products. In other words, the cluster detection application 125 can group customers according to products they are buying or in which they have an interest. For one or more items available via the electronic commerce application 119, the cluster detection application 125 can identify a subset of users that purchase or demonstrate an interest in the item to a greater degree than other users. As one example, the cluster detection application 125 can identify customers where a certain percentage of their purchases (e.g., by price, volume, etc.) exceed a threshold. As another example, the cluster detection application 125 can identify customers that exhibit a higher percentage of their purchases relative to other users. In one example, the cluster detection application 125 can identify a cluster for a group of customers who make ten percent or more of their purchases in a "gluten-free" product category, whereas only three percent of other users act similarly. Additionally, the cluster detection application 125 can also be configured to identify such a cluster if these do not purchase products that are not considered "gluten-free." In other words, the cluster detection application 125 designates customers who are a part of the "gluten-free" cluster if they purchase "gluten-free" products while purchasing less than a configurable threshold of products that are not considered "gluten-free."

As another example, the cluster detection application 125 can identify an "organic" cluster for a group of customers who make fifty percent or more of their food purchases by buying products that are designated as "organic," whereas other customers exhibit a purchase history for food products that shows less than fifty percent of "organic" products.

The cluster detection application 125 can also identify clusters on a product-by-product basis rather than on a category-by-category basis. In this way, the cluster detection application 125 can identify a cluster without detecting a product attribute or assignment with which the product is associated. Therefore, a cluster can be identified, which can inform a decision regarding an assignment 171 to which the product can be associated. The cluster detection application 125 can also identify brand preferences as well as cluster users based upon a brand preference. In other words, the cluster detection application 125 can determine whether one or more users exhibits a preference towards a particular brand of products to the exclusion of other brands in the same or similar product category. For example, if a subset of users purchases one particular brand of digital camera as well as digital camera accessories to the exclusion of another brand of camera, then the cluster detection application 125 can create a cluster of users based upon camera brand preference.

Upon detection of user clusters by the cluster detection application 125 based upon brand preference, a particular product, and/or product category, the electronic commerce application 119 can customize a buying and/or browsing experience based upon the clusters to which a particular user belongs. In some embodiments, the electronic commerce application 119 can promote or prominently display other products associated with a particular cluster to which a user belongs. In one embodiment, the electronic commerce application 119 can determine whether a user is associated with a particular cluster assignment 176 and generate targeting campaigns for products that are related to the cluster. For example, the electronic commerce application 119 can generate a targeting campaign for digital camera accessories compatible with a particular brand of camera for customers assigned to such a cluster based upon brand preference.

The clusters identified by the cluster detection application 125 can be provided as an input to the item classification application 123 so that the item classification application 123 can determine whether product assignments 171 should be created that do not presently exist. In other words, if a product not presently assigned to a "gluten-free" product assignment 171 is purchased by users belonging to a "gluten-free" cluster, the cluster detection application 125 provide this data to the item classification application 123, which can determine whether the product should be assigned to a "gluten-free" product assignment 171. In this example, the item classification application 123 can rely on any combination of data provided by cluster detection application 125, the product image analysis application 121, and/or third party or external data feeds about a product to determine whether a particular product not already associated with a "gluten-free" product assignment 171 should be given such a product assignment 171.

In one example, a rules engine executed by the item classification application 123 can be configured with a rule that generates an alert for an administrative user if a particular cluster of users exhibits purchasing behavior for a product that is not associated with the cluster, where the behavior is similar and/or equivalent to other products in the cluster. For example, if a rule specifying purchasing behavior and/or thresholds for assigning users to a "gluten-free" cluster is also satisfied by a product that is not in a "gluten-free" product assignment 171, this data can be provided to the item classification application 123 by the cluster detection application 125. Accordingly, the item classification application 123 can be configured with a rule to analyze this data in combination with data extracted from imagery of the product's packaging as well as third party data feeds to determine and generate an alert for an administrative user to examine whether the product should be given a "gluten-free" product assignment 171.

Figure 2:
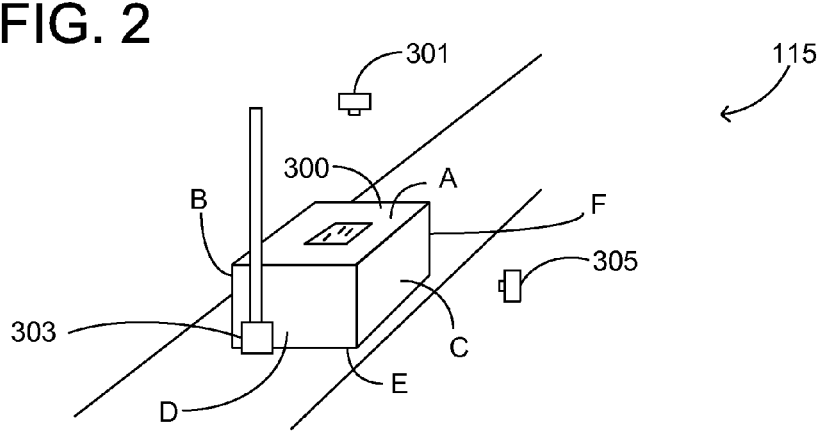
FIGS. 2-3 are drawings of an image capture station according to various embodiments of the present disclosure.
Figure 3:
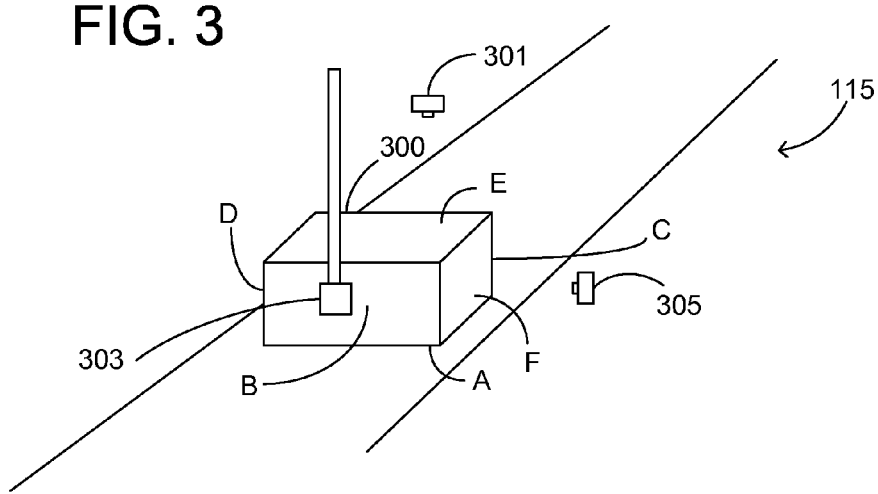

Turning now to FIGS. 2-3, shown is an example of a capture station 115 according to one embodiment of the disclosure. In the depicted example, the capture station 115 includes three cameras where one is positioned in each of an x-axis, a y-axis, and a z-axis relative to the product 300 under analysis. As shown in FIG. 2 a first camera 301 is positioned in the y-axis, a second camera 303 is positioned in the z-axis, and a third camera is positioned in the x-axis, where the referenced axes are merely one example and are relative to the capture station 115 and/or product 300 under analysis.

In the illustrated example, the cameras 301, 303, 305 can capture imagery of the product's packaging to which they are oriented. In FIG. 3, the product image analysis application 121 and/or the image capture application 136 can initiate rotation of the product about at least two of the axes so that imagery of each side of the product's packaging can be captured in the particular configuration that is shown. The depicted cameras 301, 303, 305 can transmit the captured imagery to the image capture application 136 and/or directly to the product image analysis application 121, which can analyze the captured imagery as described above. In some embodiments, the capture station 115 can comprise fewer or additional cameras compared to the embodiment shown in FIGS. 2-3. For example, the capture station 115 can include at least six cameras, where two cameras are positioned in opposing positions in each of the x-axis, y-axis and z-axis such that rotation of the product 300 under analysis is not required to capture imagery of each side of the product's packaging. Other variations regarding positioning of cameras in a capture station 115 should be appreciated.

Figure 4:
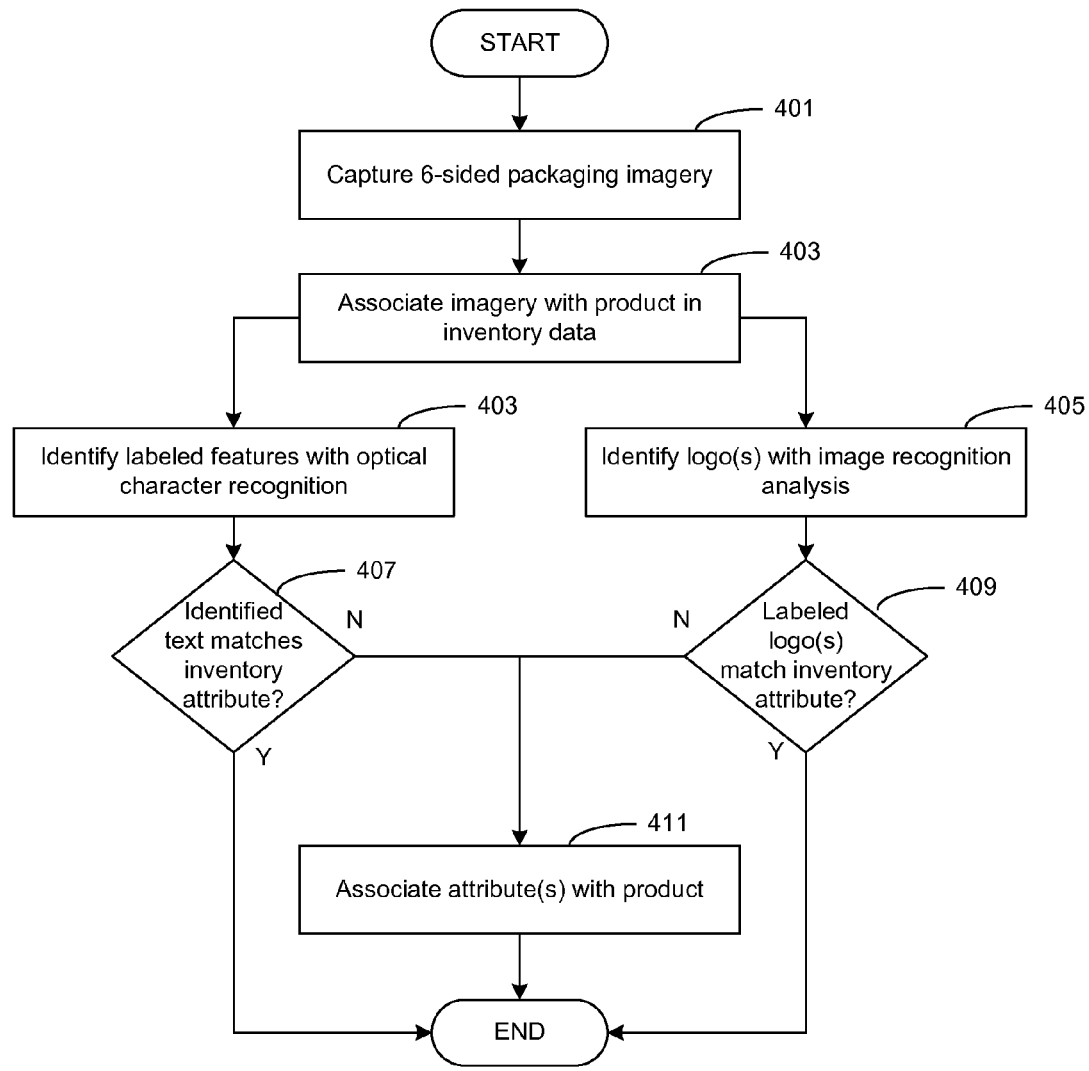
FIGS. 4-7 are flowcharts illustrating examples of functionality implemented as portions of applications executed in a computing device in the networked environment of FIG. 1 according to various embodiments of the present disclosure.

Referring next to FIG. 4, shown is a flowchart that provides one example of the operation of a portion of the product image analysis application 121 according to various embodiments. It is understood that the flowchart of FIG. 4 provides merely an example of the many different types of functional arrangements that may be employed to implement the operation of the portion of the product image analysis application 121 as described herein. As an alternative, the flowchart of FIG. 4 may be viewed as depicting an example of steps of a method implemented in the computing device 103 (FIG. 1) according to one or more embodiments.

Beginning with box 401, the product image analysis application 121 and/or image capture application 136 can initiate capture of one or more sides of a product packaging. In box 403, the product image analysis application 121 and/or image capture application 136 can associate the captured imagery with a product under analysis in the inventory data 159 associated with the product. In box 403, the product image analysis application 121 can perform an optical character recognition algorithm on text appearing on the product's packaging to identify ingredients, features, terms, keywords, attributes, and other data that may appear on the product's packaging.

In one embodiment, the product image analysis application 121 can proceed to box 407, where it determines whether text recognized as appearing on the product's packaging matches any attributes 165 associated with an inventory item 163 corresponding to the product. If not, the text identified on the product's packaging can be stored in the inventory item 163 associated with the product. Returning to box 403, the product image analysis application 121 can also attempt to identify any logos or other imagery appearing on the product's packaging in box 405. If the logos or other imagery appearing on the product packaging are stored as attributes 165 associated with the inventory item, then the product image analysis application 121 can store the attributes 165 in an inventory item 163 associated with the product in box 411.

Figure 5:
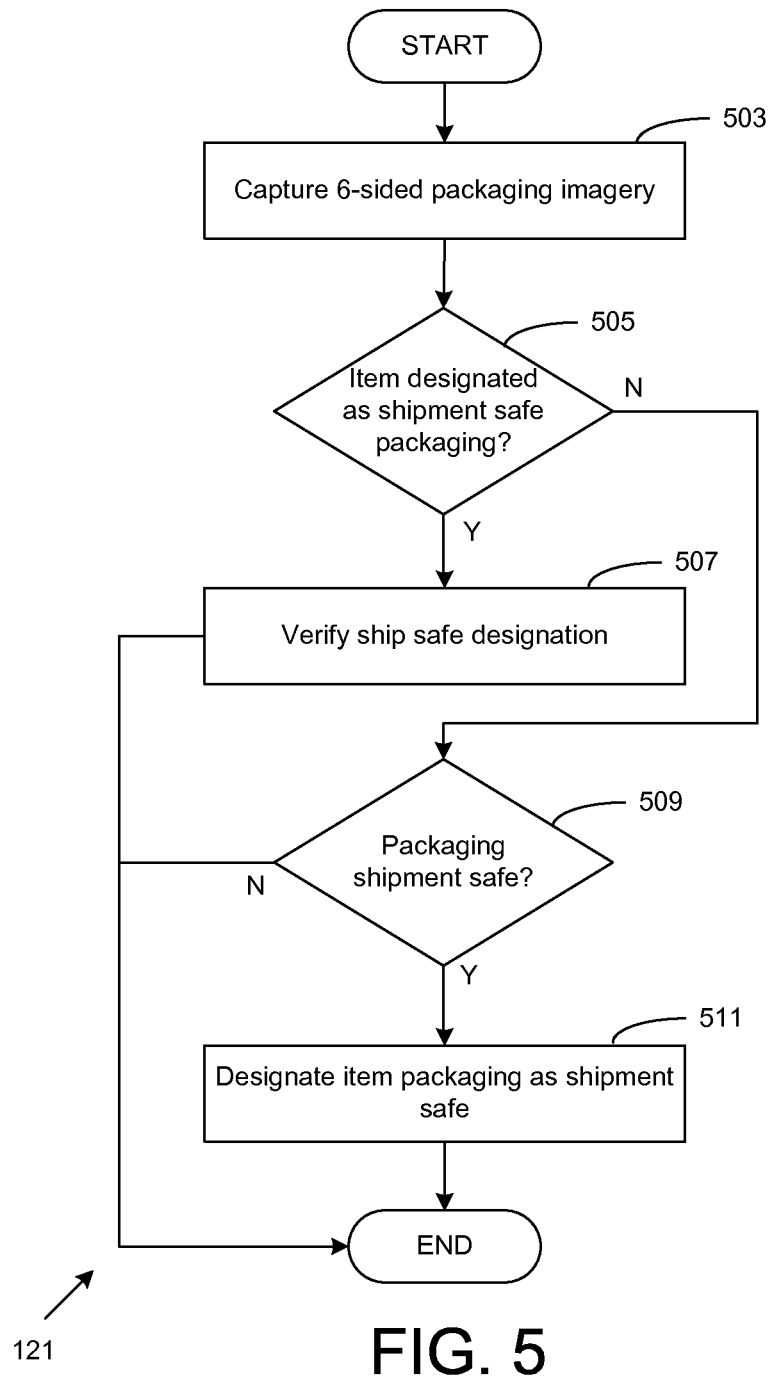

Reference is now made to FIG. 5, which illustrates an alternative example of execution of the product image analysis application 121. In the example of FIG. 5, the product image analysis application 121 can facilitate a decision regarding whether a product's packaging can be shipped in its packaging without an overbox and/or additional packing materials. Beginning with box 503, the product image analysis application 121 can initiate capture of images of the various sides of the product's packaging. In box 505, the product image analysis application 121 can verify whether the product is already designated as shipment safe. In box 507, if the product is designated as shipment safe, the product image analysis application 121 can perform at least one image analysis on the product's packaging to verify whether it is shipment safe. As noted above, the product image analysis application 121 can perform an optical character recognition analysis on the imagery to determine whether any text appearing on the packaging indicates that the product may not be shipment safe. For example, if the words "fragile" or "breakable" appear on the product's packaging, the product image analysis application 121 can determine that the packaging is not shipment safe.

Additionally, the product image analysis application 121 can perform an image recognition analysis that determines whether there any cut-outs, transparent windows, translucent windows, or other features that may indicate that the packaging is not shipment safe. If in box 505, the product is not currently designated as shipment safe, the product image analysis application 121 can, in box 509, determine whether the packaging is shipment safe as described above. If the product image analysis application 121 can determine that the product's packaging is shipment safe, it can be so designated in box 511.

Figure 6:
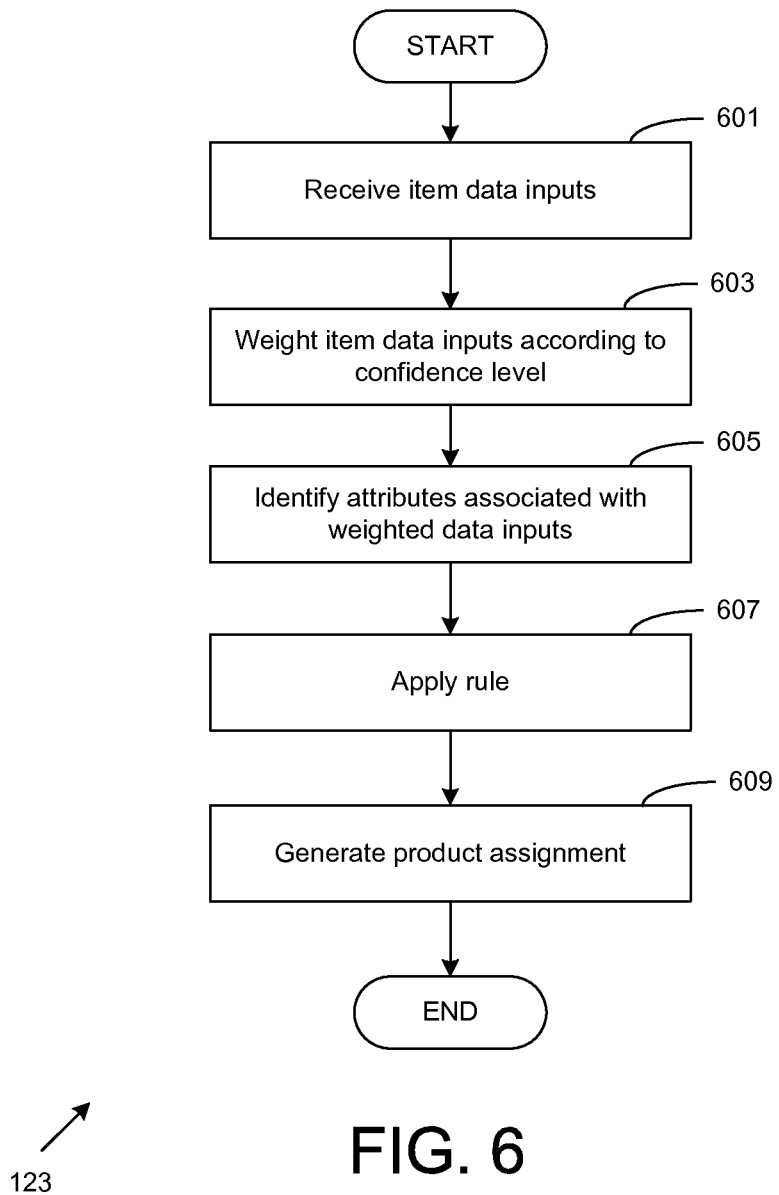

Reference is now made to FIG. 6, which depicts an example of execution of the item classification application 123. As noted above, the item classification application 123 can associate products with product categories based on various inputs, which can include, but are not limited to, keywords or terms associated with the product, attributes extracted from an image analysis of the product's packaging, third party data sources such as certification boards, government sources, etc., as well as clusters identified by the cluster detection application 125. In box 603, these inputs can be weighted according to various confidence levels assigned to the data sources. As one example, a certification in a data feed provided by a third party certification board can be assessed a higher confidence rating than text that may appear on the product's packaging. In box 605, the item classification application 123 can identify the product attributes associated with the weighted inputs and apply a rule that determines whether to assign a product assignment to the product in box 607, which can be generated in box 609.

Figure 7:
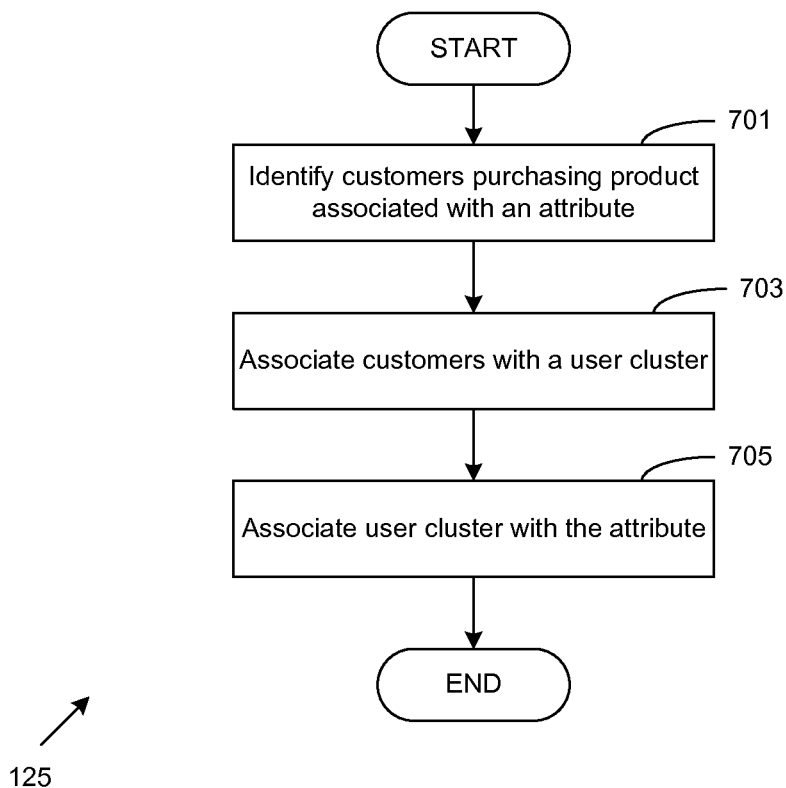

Reference is now made to FIG. 7, which illustrates one example of execution of the cluster detection application 125. In box 701, the cluster detection application 125 can identify a subset of users purchasing a product that is associated with one or more attributes. In box 703, the users are associated with a cluster, and in box 705, the cluster is associated with an attribute that is common among the users. As noted above, the clusters identified by the cluster detection application can be provided as an input to the item classification application 123 to determine product categories to which products can be assigned.

Figure 8:
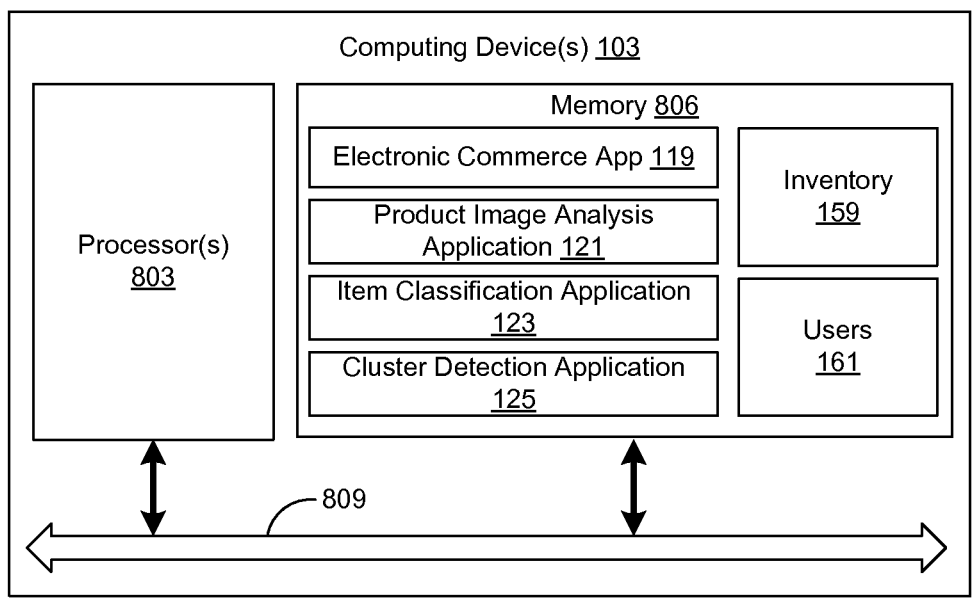
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the product image analysis application 121, the item classification application 123, the cluster detection application 125, and potentially other applications. Also stored in the memory 806 may be a data store and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the product image analysis application 121, item classification application 123, cluster detection application 125, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4-7 show the functionality and operation of an implementation of portions of the various applications discussed herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable by a computing device, the program, when executed by the computing device, causing the computing device to at least:
    identify a subset of users among a plurality of users as being associated with at least one product by:
        determining that at least a threshold percentage of total purchases of the subset of users is made from a category associated with the at least one product; and
        determining that the threshold percentage is higher than an average percentage of total purchases made from the category associated with the at least one product by a remainder of the plurality of users;
    associate the subset of users with a cluster;
    associate the cluster with the at least one product and the category associated with the at least one product;
    store the cluster in a data store accessible to the computing device; and
    recommend at least one other product associated with the category to at least one of the subset of users.

2. The non-transitory computer-readable medium of claim 1, further causing the computing device to at least:
    identify the cluster as being associated with a brand preference in response to determining that the threshold percentage of total purchases of the subset of users is made from a particular brand; and
    recommend at least one other product associated with the particular brand to the at least one of the subset of users.

3. The non-transitory computer-readable medium of claim 1, further causing the computing device to at least:
identify at least one term appearing on packaging of the at least one product; and
associate the cluster with the at least one term.

4. A system, comprising:
at least one computing device;
a cluster detection application executable in the at least one computing device, the cluster detection application configured to cause the at least one computing device to at least:
identify a subset of users among a plurality of users as being associated with at least one product by:
determining that at least a threshold percentage of total purchases of the subset of users is made from a category associated with the at least one product; and
determining that the threshold percentage is higher than an average percentage of total purchases made from the category by a remainder of the plurality of users;
associate the subset of users with a cluster;
associate the cluster with the at least one product; and
store the cluster in a data store accessible to the at least one computing device.

5. The system of claim 4, wherein the cluster detection application is further configured to cause the at least one computing device to at least:
identify at least one product category appearing on packaging of the at least one product; and
associate the cluster with the at least one product category.

6. The system of claim 4, further comprising an item classification application executed on the at least one computing device, wherein the item classification application causes the at least one computing device to at least:
determine that the at least one product associated with the cluster is associated with another category corresponding to an attribute associated with the at least one product; and
generate a category assignment that associates the at least one product with the other category corresponding to the attribute associated with the at least one product.

7. The system of claim 6, wherein the item classification application further causes the at least one computing device to at least:
identify at least one term extracted from at least one image of a packaging of the at least one product;
determine that the at least one term corresponds to the attribute associated with the at least one product; and
generate the category assignment in response to the at least one term corresponding to the attribute associated with the at least one product.

8. The system of claim 7, wherein the at least one image comprises a plurality of images of a plurality of sides of the at least one product.

9. The system of claim 6, wherein the item classification application further causes the at least one computing device to at least:
receive at least one third party data feed containing at least one entry associated with the at least one product, the at least one entry identifying the attribute; and
wherein the category assignment associates the other category with the at least one product based at least upon the at least one entry in the at least one third party data feed.

10. The system of claim 9, wherein the at least one third party data feed further comprises a data feed from a certification board, the data feed identifying that the at least one product is associated with a certification from the certification board.

11. The system of claim 9, wherein the at least one third party data feed further comprises a data feed from a testing board, the data feed identifying that the at least one product is associated with a certification from the testing board.

12. The system of claim 4, further comprising an item classification application executed by the at least one computing device, wherein the item classification application further causes the at least one computing device to at least render a user interface facilitating modification of at least one category assignment associated with the at least one product.

13. A computer-implemented method, comprising:
identifying, via at least one computing device, a subset of users among a plurality of users as being associated with at least one product by determining that at least a threshold percentage of total purchases of the subset of users is made from a category associated with the at least one product;
associating, via the at least one computing device, the subset of users with a cluster;
associating, via the at least one computing device, the cluster with the at least one product; and
storing, via the at least one computing device, the cluster in a data store accessible to the at least one computing device.

14. The computer-implemented method of claim 13, wherein associating the subset of users with the cluster further comprises determining, via the at least one computing device, that the threshold percentage of total purchases of the subset of users comprises purchases of the at least one product.

15. The computer-implemented method of claim 13, further comprising generating, via the at least one computing device, a recommendation comprising at least one other product associated with the category in a user interface associated with a client device of at least one of the subset of users.

16. The computer-implemented method of claim 13, further comprising:
identifying, via the at least one computing device, a term appearing on packaging of the at least one product; and
associating, via the at least one computing device, the cluster with the term.

17. The computer-implemented method of claim 16, further comprising:
identifying, via the at least one computing device, a nutritional category associated with the at least one product based at least in part upon the term appearing on the packaging of the at least one product; and
associating, via the at least one computing device, the cluster with the nutritional category.

18. The computer-implemented method of claim 13, wherein associating the subset of users with the cluster further comprises determining, via the at least one computing device, that the threshold percentage is higher than an average percentage of total purchases made by a remainder of the plurality of users from the category associated with the at least one product.

19. The computer-implemented method of claim 13, further comprising:
determining, via the at least one computing device, that the at least one product associated with the cluster is associated with another category corresponding to an attribute associated with the at least one product; and generating, via the at least one computing device, a category assignment that associates the at least one product with the other category corresponding to the attribute.

20. The computer-implemented method of claim 19, further comprising:

obtaining, via the at least one computing device, a third party data feed containing an entry associated with the at least one product, the entry identifying the attribute; and wherein the category assignment associates the other category with the at least one product based at least upon the entry in the third party data feed.

* * * * *